(12) United States Patent
Park et al.

(10) Patent No.: US 9,258,392 B2
(45) Date of Patent: Feb. 9, 2016

(54) METHOD AND APPARATUS FOR GENERATING METADATA OF IMMERSIVE MEDIA

(71) Applicant: Electronics and Telecommunications Research Institute, Daejeon (KR)

(72) Inventors: Mi Ryong Park, Suwon (KR); Hyun Woo Oh, Daejeon (KR); Jae Kwan Yun, Daejeon (KR); Mi Kyong Han, Daejeon (KR); Ji Yeon Kim, Daejeon (KR); Deock Gu Jee, Daejeon (KR); Kwang Roh Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 135 days.

(21) Appl. No.: 14/086,898

(22) Filed: Nov. 21, 2013

(65) Prior Publication Data

US 2014/0148220 A1 May 29, 2014

(30) Foreign Application Priority Data

Nov. 23, 2012 (KR) .................... 10-2012-0133511

(51) Int. Cl.
| | |
|---|---|
| *H04M 1/00* | (2006.01) |
| *H04M 1/02* | (2006.01) |
| *H04M 1/725* | (2006.01) |
| *G06F 1/16* | (2006.01) |
| *H04N 21/41* | (2011.01) |
| *H04N 21/81* | (2011.01) |
| *H04N 21/8543* | (2011.01) |

(52) U.S. Cl.
CPC ........... *H04M 1/0202* (2013.01); *G06F 1/1684* (2013.01); *G06F 1/1686* (2013.01); *G06F 1/1694* (2013.01); *H04M 1/72522* (2013.01); *H04N 21/4131* (2013.01); *H04N 21/8126* (2013.01); *H04N 21/8543* (2013.01); *H04M 2250/10* (2013.01); *H04M 2250/12* (2013.01); *H04M 2250/52* (2013.01)

(58) Field of Classification Search
CPC ....... H04W 4/008; H04W 12/08; H04W 4/12; H04M 2250/12; H04M 1/72569; H04M 1/0264
USPC .............. 455/418, 420, 39, 41.2, 41.3, 67.11, 455/556.1, 344; 348/14.08, 14.09, 208.16, 348/211.2
See application file for complete search history.

(56) References Cited

U.S. PATENT DOCUMENTS

| | | | | |
|---|---|---|---|---|
| 8,749,610 | B1* | 6/2014 | Gossweiler et al. | 348/14.08 |
| 2005/0165795 | A1 | 7/2005 | Myka et al. | |
| 2012/0169855 | A1* | 7/2012 | Oh | 348/61 |
| 2014/0280983 | A1* | 9/2014 | Paluch et al. | 709/227 |

FOREIGN PATENT DOCUMENTS

| | | |
|---|---|---|
| KR | 10-2006-0104329 A | 10/2006 |
| KR | 10-2011-0083456 A | 7/2011 |

* cited by examiner

*Primary Examiner* — Sonny Trinh

(57) ABSTRACT

Disclosed are a method and an apparatus for generating metadata of immersive media and disclosed also are an apparatus and a method for transmitting metadata related information. The apparatus includes: at least one of a camera module photographing or capturing the image; a gyro module sensing horizontality; a global positioning sensor (GPS) module calculating a position by receiving a satellite signal; and an audio module recording audio; and a network module receiving sensor effect information from a sensor aggregator through a wireless communication network; and an application generating metadata by performing timer-synchronization of an image photographed based on the camera module, a sensor effect collected by using the gyro module or the GPS module, or audio collected based on the audio module.

17 Claims, 3 Drawing Sheets

METHOD AND APPARATUS FOR GENERATING METADATA OF IMMERSIVE MEDIA

This application claims the benefit of priority of Korean Patent Application No. 10-2012-0133511 filed on Nov. 23, 2012, which is incorporated by reference in its entirety herein.

BACKGROUND OF THE INVENTION

1. Field of the Invention

The present invention relates to an immersive image or immersive media, and more particularly, to a method and an apparatus for generating immersive media in link with a smart phone and a sensor aggregator.

2. Discussion of the Related Art

There is a method for producing 4D media for 4D rider media or a 4D cinema by providing a 3D effect after producing a general 2D image or adding an immersive effect to 3D media generated through a 3D camera. There is a method for making a user feel reality by controlling a device (e.g., a chair) or controlling other 4D effects by adding a 4D effect for each element based on a 2D image or 3D media.

Media and control devices are non-standardized, and as a result, it is difficult to interexchange media. A new immersive effect should be produced so that it is operated in a new rider device. To this end, an MPEG-V standard is established in ISO.

The MPEG-V (Media Context and Control standards) standard is a standard established in the Moving Picture Experts Group (MPEG) which is a representative international standardized organization for multimedia contents and MPEG defines an interface specification for communications between virtual worlds and between the virtual world and a real world through an MPEG-V project (ISO/IEC 23005). Objects which are being subjected to standardization handle various ranges such as from a description method of immersive effects such as wind, temperature, vibration, and the like to a description method of avatars and virtual objects, a control command description method for linking a virtual world and a device, and the like. The MPEG-V standard is generally divided into seven parts to be in progress.

Part 1 handles discloses an outline and an architecture for the overall MPEG-V system, Part 2 defines a description method of device performance information for assuring intercompatibility and user preference information for controlling a user customized device in controlling the device, Part 3 defines immersive effects which are expressible in the virtual world or the real world, Part 4 defines standardized types for avatars or virtual objects, Part 5 defines formats for control signals and sensor information for linking the virtual world and the device, Part 6 defines data types which can be commonly used in all parts of the MPEG-V, and Part 7 provides reference software.

In particular, a system function in which the real world and the virtual world can communicate with each other through intelligent sensors such as an eye tracking sensor, a coordinate measurement sensor, a multi-pointing sensor, and the like and user information description and management methods required to provide a social network service (SNS) are issue technologies being discussed.

In particular, the coordinate measurement sensor means all devices that enable position measurement, and a position to be measured may also be an absolute position or a relative position. The coordinate measurement sensor represents a GPS, a GSM based triangulation sensor, a Wi-Fi based triangulation sensor, a non-contact position sensor, or the like and if positional information of a standard specification acquired from the sensor and a record of a specific time are linked with each other, an application such as tracking an accident position for various vehicles becomes available.

Further, there is a user information description method for providing the social network service using a smart phone, and the like. As interest in a virtual space is rising and related services are increasing, the avatar of the virtual world may not be a virtual character but a very suitable element as a means for the social network service as the user's second self reflecting the user's personal profile of the real world. The avatar reflects the user's profile and can communicate with another avatar or another object in the virtual space through described profile information.

In the MPEG-V standard, it is up to a producer for each company to establish a standard for an immersive effect added to an image and add or change the established standard. The company is equipped with a production tool capable of producing 4D media or a demonstration system capable of demonstrating the 4D media.

The production tool developed by each company provides a function to add, modify, or change the immersive effect to 2D media or 3D media. A process of producing immersive media by using the production tool is a repeated work which is continued whenever changing the media and a work requiring a lot of time and efforts.

Meanwhile, the smart phone is widely used by general users as an image aggregator and a lot of media using the smart phone are also produced on trial. However, there is a limit in producing 4D media as media photographed by the smart phone.

SUMMARY OF THE INVENTION

An object of the present invention is to provide a method and an apparatus for generating immersive media.

Further, another object of the present invention is to produce immersive media by adding an immersive effect to an image photographed by a smart phone.

Moreover, yet another object of the present invention is to provide a method for linking a smart phone and a sensor device capable of recording metadata for immersive media.

In addition, still another object of the present invention is to easily produce an image photographed by a smart phone as metadata.

Besides, still yet another object of the present invention is to produce or interexchange 4D media by using produced metadata in various production tools or reproduction systems.

In accordance with an embodiment of the present invention, a terminal device generating metadata of an image, includes: at least one of a camera module photographing or capturing the image; a gyro module sensing horizontality; a global positioning sensor (GPS) module calculating a position by receiving a satellite signal; and an audio module recording audio, and a network module receiving sensor effect information from a sensor aggregator through a wireless communication network; and an application generating metadata by performing timer-synchronization of an image photographed based on the camera module, a sensor effect collected by using the gyro module or the GPS module, or audio collected based on the audio module.

The application may record the metadata in a file and close the media file in which the metadata is being recorded when receiving an end event.

If the media file is a file recorded based on Moving Picture Experts Group4 (MPEG4), when the media file is closed, the metadata may be used as a track of the media file.

When the application receives an AV event meaning recording of audio video (AV) data, the photographed image and the collected audio are combined to be recorded in an AV media file.

The AV media file is recorded as a name of a date-time-sequence number format, and if there is no AV media file which was prepared previously, the AV media file is newly generated or if the AV media file which is opened in advance, a content may be recorded to be added.

The application may allow the metadata to further include the sensor effect information received through the network module when receiving a sensor event meaning receiving of sensor data.

The application may allow the metadata to further include the sensor effect collected from the gyro module or the GPS module when receiving a local sensor event meaning collecting of the sensor effect in the terminal device.

The application may perform connection setting with the sensor aggregator based on an Internet protocol (IP) address of the sensor aggregator.

The application may perform the timer synchronization by transmitting a timer synchronization message to the sensor aggregator through the network module.

In accordance with another embodiment of the present invention, a method for generating metadata of an image in a terminal device includes receiving sensor effect information from a sensor aggregator through a wireless communication network; generating the metadata by timer-synchronizing an image photographed based on a camera module, a sensor effect collected by using a gyro module or a GPS module, or audio recorded based on an audio module, and when an end event is received, the metadata is recorded as a media file and the recording media file is closed, when an AV event meaning recording of audio video (AV) data is received, the photographed image and the recorded audio are combined to be recorded in the media file, when a sensor event meaning receiving of sensor data is received, the metadata further includes the sensor effect information received through the network module, and when a local sensor event meaning collecting of a sensor effect is received by the terminal device, the metadata may further include the sensor effect collected by the gyro module or the GPS module.

In accordance with yet another embodiment of the present invention, a sensor aggregator transmitting information for generating metadata of an image includes at least one of a $CO_2$ sensor, a light sensor generating an illumination effect through the brightness of light, a humidity sensor generating a waterjet effect by detecting humidity, a temperature sensor generating a thermal effect by measuring a temperature, and a wind sensor generating a wind effect by measuring a wind strength; a sensor aggregating unit aggregating or analyzing information collected through at least one of the $CO_2$ sensor, the light sensor, the humidity sensor, the temperature sensor, and the wind sensor; and a network module transmitting the sensor effect information to a terminal device through a wireless communication network.

In accordance with still another embodiment of the present invention, a method for transmitting information related to metadata in a sensor aggregator includes the steps of collecting a sensor effect from a $CO_2$ sensor detecting $CO_2$ gas, a light sensor generating an illumination effect by adjusting the brightness of light, a humidity sensor generating a waterjet effect by detecting humidity, a temperature sensor generating a thermal effect by measuring a temperature, or a wind sensor generating an wind effect by measuring a wind strength; generating sensor effect information by aggregating or analyzing the collected sensor effect; and transmitting the sensor effect information to a terminal device through a wireless communication network.

According to the present invention, devices such as a camera, an audio, a GPS, a gyro, and the like which are possessed by a smart phone or a sensor aggregator and MPEG-V immersive effect media can be linked with each other, and media or metadata including an immersive effect of the MPEG-V can be generated.

DETAILED DESCRIPTION OF THE EMBODIMENTS

Figure 1:
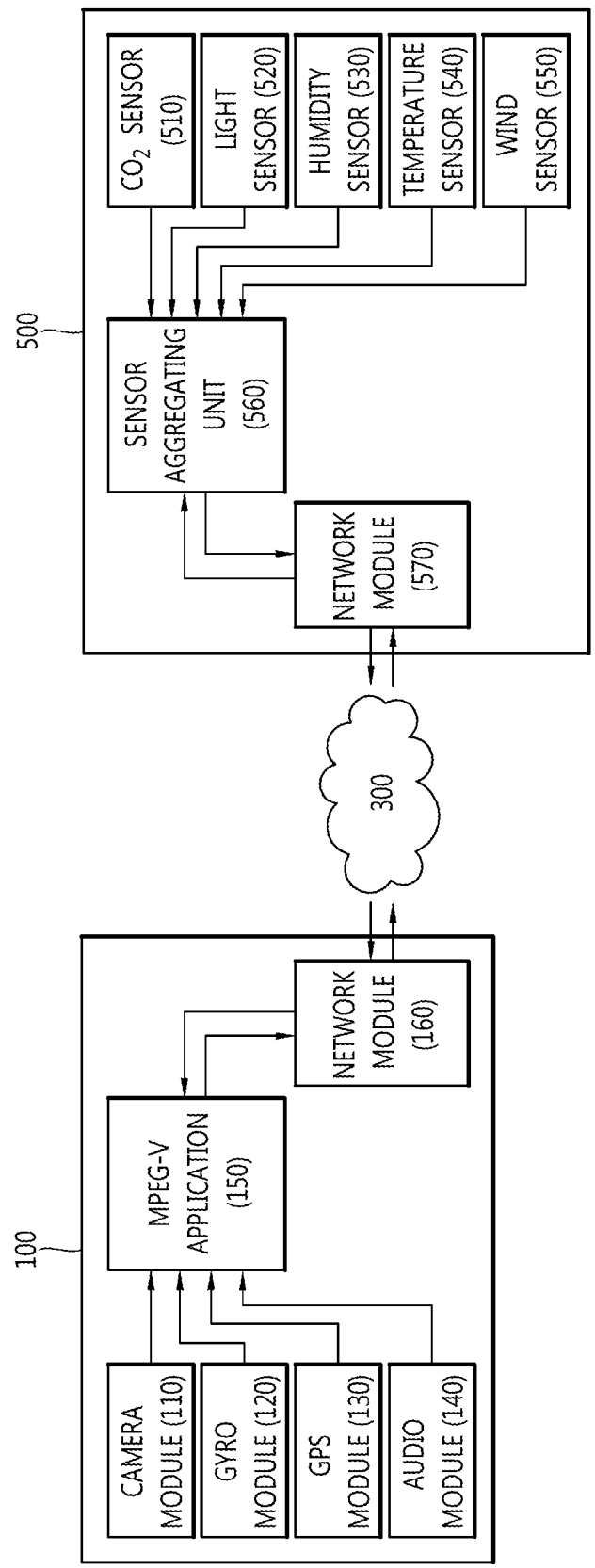
FIG. 1 is a block diagram illustrating one example of an apparatus for generating immersive media according to an embodiment of the present invention.

Hereinafter, embodiments of the present invention are described in detail with reference to the accompanying drawings. In describing the embodiments of the present invention, a detailed description of related known elements or functions will be omitted if it is deemed to make the gist of the present invention unnecessarily vague.

In this specification, when it is said that one element is 'connected' or 'coupled' with the other element, it may mean that the one element may be directly connected or coupled with the other element and a third element may be 'connected' or 'coupled' between the two elements. Furthermore, in this specification, when it is said that a specific element is 'included', it may mean that elements other than the specific element are not excluded and that additional elements may be included in the embodiments of the present invention or the scope of the technical spirit of the present invention.

Terms, such as the first and the second, may be used to describe various elements, but the elements are not restricted by the terms. The terms are used to only distinguish one element from the other element. For example, a first element may be named a second element without departing from the scope of the present invention. Likewise, a second element may be named a first element.

Hereinafter, embodiments of the present invention will be described in detail with reference to the accompanying drawings such that those skilled in the art can easily implement the embodiments. However, the present invention may be implemented in various different forms and hereinafter, the present invention is not limited to embodiments described below. Further, elements which are not associated with the present invention are omitted in order to clearly describe the present invention and in the drawings, the same reference numerals refer to the same elements.

Objects and effects of the present invention may be naturally appreciated or more apparent and the objects and effects of the present invention are not limited by only the following description.

The objects, features, and advantages of the present invention will be more apparent through a detailed description below. Further, it is judged that a detailed description of a known art associated with the present invention may make the gist of the present invention be obscure, the detailed description thereof will be omitted. Hereinafter, embodiments of the present invention will be described in detail with reference to the accompanying drawings.

FIG. 1 is a block diagram illustrating one example of an apparatus for generating immersive media according to an embodiment of the present invention.

Referring to FIG. 1, a smart phone 100 and a sensor aggregator 500 may be linked with each other through a wireless network 300. Herein, the smart phone is one example and the present invention may be applied to all terminal devices that perform wireless communication and generate or store metadata. For convenience, the terminal device will be hereinafter referred to as the smart phone.

The smart phone 100 may include a camera module 110 photographing an image, a gyro module 120 sensing horizontality, a global positioning sensor (GPS) module 130 calculating a position by receiving a satellite signal, or an audio module 140 recording audio. A user may produce personal media such as a user created content, and the like by using the camera module 110, the gyro module 120, the GPS module 130, or the audio module 140.

Further, the smart phone 100 may include an MPEG-V application 150 that generates metadata (alternatively, referred to as "MPEG-V immersive effect metadata") according to timer synchronization (alternatively, referred to as "through timer synchronization") by using the image photographed based on the camera module 110, a sensor effect (alternatively, "sensor effect information") collected by using the gyro module 120 or the GPS module 130, and the audio recorded based on the audio module 140. Although expressed as the MPEG-V application, a scope of the present invention is not limited to MPEG-V data and all devices that generate metadata of an immersive image may operate according to the present invention.

Further, the smart phone 100 may include a network module 160 that performs wireless communication with the sensor aggregator 500.

The user may utilize the sensor aggregator 500 that generates MPEG-V immersive effect metadata in order to express an immersive effect independently of the sensor device in the smart phone, such as the gyro module 120 or the GPS module 130. This device may be called a sensor collector.

As one example, the sensor collector 500 may include at least one of a $CO_2$ sensor 510 detecting $CO_2$ gas, a light sensor 520 generating an illumination effect through the brightness of light, a humidity sensor 530 generating a waterjet effect by detecting humidity, a temperature sensor 540 generating a thermal effect by measuring a temperature, and a wind sensor 550 generating a wind effect by measuring a wind strength.

Further, the sensor aggregator 500 may further include a sensor aggregating unit 560 that aggregates or analyzes information collected through at least one of the $CO_2$ sensor 510, the light sensor 520, the humidity sensor 530, the temperature sensor 540, and the wind sensor 550.

In addition, the sensor aggregator 500 may include a network module 570 that performs wireless communication with the smart phone 570.

The network module 160 of the smart phone 100 and the network module 570 of the sensor aggregator 500 may be linked with each other through the wireless communication network 300 such as WiFi, 3G, or LTE (long term evolution). Therefore, the MPEG-V application of 150 of the smart phone 100 and the sensor aggregating unit 560 of the sensor aggregator 500 may be linked with each other.

Figure 2:
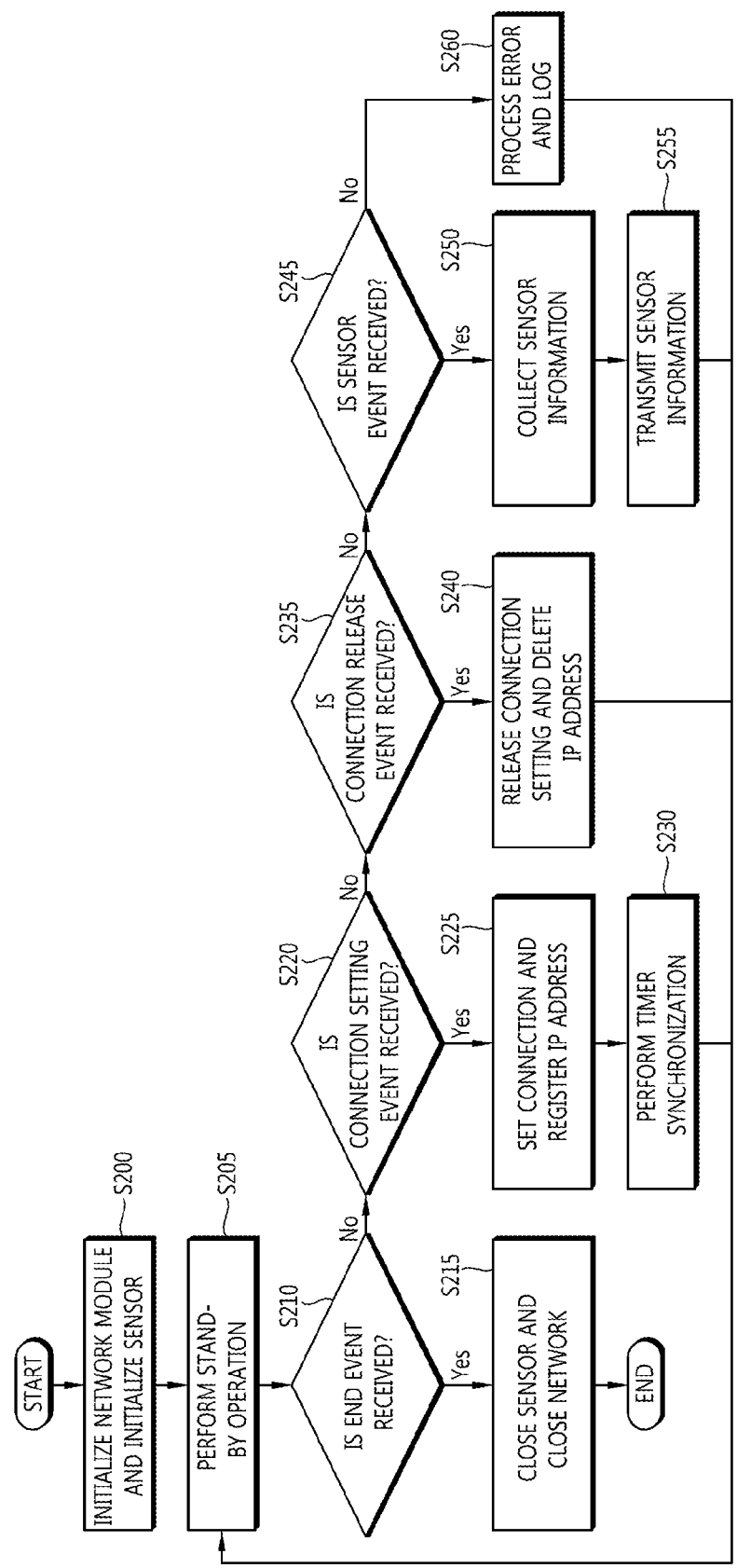
FIG. 2 is a flowchart illustrating one example of an operation of a sensor aggregator.

FIG. 2 is a flowchart illustrating one example of an operation of the sensor aggregator.

Referring to FIG. 2, the sensor aggregating unit 560 initializes the network module 570 and initializes the sensors 510, 520, 530, 540, and 550 (S200).

In a basic operation state, the sensor aggregator 500 performs a stand-by operation in order to receive various events (S205). The sensor aggregator 500 operates as in S210 to S260 below when receiving (alternatively, being input with) an end event, a connection request event, a connection close event, or a sensor event from the user, from the smart phone, or from a predetermined input device while performing the stand-by operation.

The sensor aggregator 500 determines whether to receive the end event meaning the end of the device during the stand-by operation (S210) and closes all of the sensor devices 510, 520, 530, 540, and 550 and closes the network module 570 when receiving the end event (S215). Subsequently, the sensor aggregator 500 may end an application program.

When the sensor aggregator 500 receives the connection request event (alternatively, connection set request event) of the smart phone 100 during the stand-by operation (S220), the sensor aggregator 500 sets connection with the smart phone 100 and registers an Internet Protocol (IP) address of the smart phone 100 in a connection-set list (S225), and performs timer synchronization with the smart phone 100 (S230). The sensor aggregator 500 may perform time setting based on a time transmitted from the smart phone 100. The sensor aggregator 500 that completes the timer synchronization performs the stand-by operation (S205). The sensor aggregator 500 prepares a next operation in an event stand-by state.

Alternatively, when the sensor aggregator 500 receives a connection release event (alternatively, connection set release event) of the smart phone 100 during the stand-by operation (S235), the sensor aggregator 500 releases connection setting with the smart phone 100 and deletes the IP address of the smart phone 100 from the connection setting list (S240). Subsequently, the sensor aggregator 500 performs the stand-by operation (S205). The sensor aggregator 500 prepares the next operation in the event stand-by state.

When the sensor aggregator 500 receives the sensor event in which data on the sensor is changed during the stand-by operation to transmit the sensor data (S245), the sensor aggregator 500 collects or aggregates the sensor data (S250), and retrieves IP addresses from the connection setting list and transmits the sensor data collected by the smart phone, which is related with a corresponding IP address (S255). Subsequently, the sensor aggregator 500 performs the stand-by operation (S205). The sensor aggregator 500 prepares the next operation in the event stand-by state.

When the sensor aggregator 500 receives (alternatively, is input with) events other than the end event, the connection request event, the connection close event, or the sensor event from the user during the stand-by operation, the sensor aggregator 500 processes an error and a log (S260) and thereafter, performs the stand-by operation again (S205). The sensor aggregator 500 prepares the next operation in the event stand-by state.

According to another embodiment of the present invention, a method for generating metadata of an image in a terminal device includes the steps of receiving sensor effect information from a sensor aggregator through a wireless communication network; generating the metadata by timer-synchronizing an image photographed based on a camera module, a sensor effect collected by using a gyro module or a GPS module, or audio recorded based on an audio module, and when an end event is received, the metadata is recorded as a media file and the recording media file is closed, when an AV event meaning recording of audio video (AV) data is received, the photographed image and the recorded audio are combined to be recorded in the media file, when a sensor event meaning receiving of sensor data is received, the metadata further includes the sensor effect information received through the network module, and when a local sensor event meaning collecting of a sensor effect is received by the terminal device, the metadata may further include the sensor effect collected by the gyro module or the GPS module.

Figure 3:
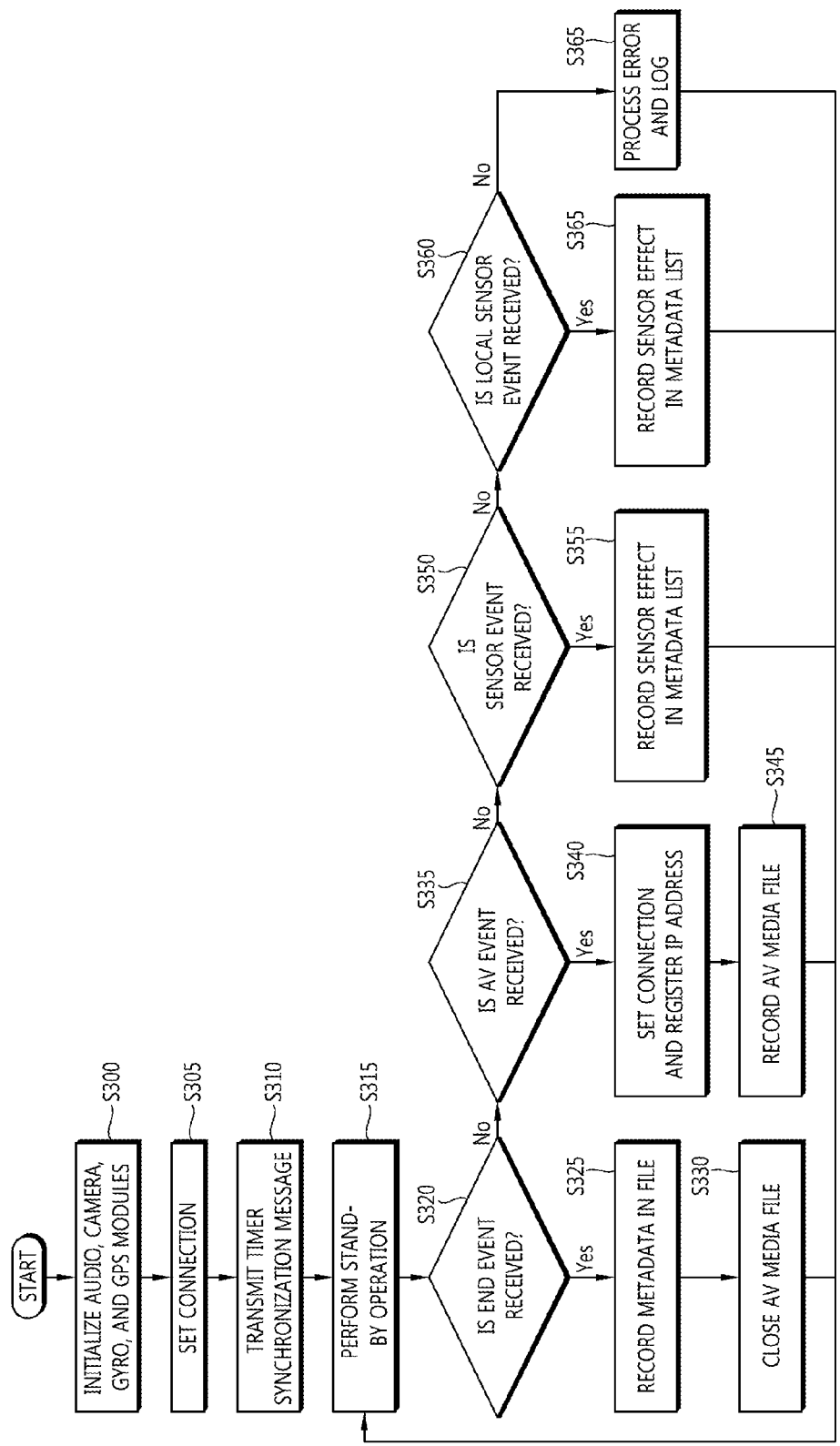
FIG. 3 is a flowchart illustrating one example of an operation of a smart phone.

FIG. 3 is a flowchart illustrating one example of an operation of a smart phone. As one example of an operation of the MPEG-V application 150 included in the smart phone, the MPEG-V application 150 finds an IP address of the sensor aggregator 500 that exits in an initial network and may record video and audio.

Referring to FIG. 3, the MPEG-V application 150 initializes the camera module 110, the gyro module 120, the GPS module 130, or the audio module 140 (S300). Further, the MPEG-V application 150 may initialize even the network module 160.

Subsequently, the MPEG-V application 150 performs connection setting with the sensor aggregator 500 based on the IP address of the sensor aggregator 500 (S305).

Subsequently, the MPEG-V application 150 transmits a timer synchronization message to the sensor aggregator 500 through the network module 160 (S310).

In a basic operation state, the sensor aggregator 150 performs the stand-by operation in order to receive various events (S315). When the MPEG-V application 150 receives (alternatively, is input with) the end event, the audio video (AV) event, the sensor event, or the local sensor event from the user while performing the stand-by operation, the MPEG-V application 150 operates as S320 to S365.

The MPEG-V application 150 determines whether to receive the end event during the stand-by operation (S320), records metadata (e.g., metadata recorded in a metadata list) collected from the sensor devices in a file when receiving the end event (S325), and closes an AV media file in which the metadata is being recorded (S330).

Herein, the AV media file may be a moving picture, an audio file, or a moving picture/audio file. If the AV media file follows a standard of MPEG4, when the AV media file is closed, metadata of MPEG-V may be used as a track of the AV media file. Subsequently, the MPEG-V application 150 performs the stand-by operation (S315). The MPEG-V application 150 prepares the next operation in the event stand-by state.

When the MPEG-V application 150 receives not the end event but the AV event for recording AV data (S335), the MPEG-V application 150 captures video by using the camera module 110 or collects audio by using the audio module 140 (S340), and combines the captured video and the collected audio to record the combined video and audio in the file as an AV media format (S345). As one example, the AV media file may be recorded as a name of a date-time-sequence number format, and if there is no AV media file which was prepared previously, the AV media file may be newly generated and thereafter, recorded and if the AV media file is opened, a content may be recorded to be added. Subsequently, the MPEG-V application 150 performs the stand-by operation (S315). The MPEG-V application 150 prepares the next operation in the event stand-by state.

When the MPEG-V application 150 receives not the AV event but the sensor event in which the sensor data is received from the sensor aggregator 500 (S350), the MPEG-V application 150 records the sensor effect data (alternatively, referred to as the sensor effect) received through the network module 160 according to the synchronized time in the metadata list (S355). Subsequently, the MPEG-V application 150 performs the stand-by operation (S315). The MPEG-V application 150 prepares the next operation in the event stand-by state.

When the MPEG-V application 150 receives the local sensor event in which the sensor effect is collected from a module possessed by the smart phone 100 itself (S360), the MPEG-V application 150 records, in the metadata list, the sensor effect (alternatively, sensor effect data) collected from the module of the smart phone similarly as processing of the sensor effect received through the network module (S365). The local sensor event represents an event in which the GPS module 130 or the gyro module 120 possessed by the smart phone 100 collects the sensor effect. Subsequently, the MPEG-V application 150 performs the stand-by operation (S315). The MPEG-V application 150 prepares the next operation in the event stand-by state.

When the MPEG-V application 150 receives (alternatively, is input with) events other than the end event, the AV event, the sensor event, or the local sensor event during the stand-by operation, the MPEG-V application 150 processes an error and a log (S365) and thereafter, performs the stand-by operation again (S315). The MPEG-V application 150 prepares the next operation in the event stand-by state.

According to yet another embodiment of the present invention, a method for transmitting information related to metadata in a sensor aggregator includes the steps of collecting a sensor effect from a $CO_2$ sensor detecting $CO_2$ gas, a light sensor generating an illumination effect by adjusting the brightness of light, a humidity sensor generating a waterjet effect by detecting humidity, a temperature sensor generating a thermal effect by measuring a temperature, or a wind sensor generating an wind effect by measuring a wind strength; generating sensor effect information by aggregating or analyzing the collected sensor effect; and transmitting the sensor effect information to a terminal device through a wireless communication network.

In this case, the method may further include the step of closing the $CO_2$ sensor, the light sensor, the humidity sensor, the temperature sensor, and the wind sensor, closing the network module, and ending an application program when the end event is input.

Further, the method may further include the step of performing connection setting with the terminal device, registering an Internet protocol (IP) address of the terminal device in a connection setting list, and performing timer synchronization with the terminal device, when a connection request event of the terminal device is input.

Further, the method may further include the step of releasing the connection setting with the terminal device and deleting the IP address of the terminal device written in the connection setting list, when a connection release event of the terminal device is input.

In addition, the method may further include a step of collecting the sensor effect information from the $CO_2$ sensor, the light sensor, the humidity sensor, the temperature sensor, or the wind sensor, retrieving IP addresses from the connection setting list, and transmitting the sensor effect information to a terminal device corresponding to the IP address, when a sensor event meaning transmitting of the sensor effect information is input.

Since various substitutions, modifications, and changes can be made by those skilled in the art within the scope without departing from the spirit of the present invention, the present invention is not limited by the aforementioned embodiments and the accompanying drawings.

In the aforementioned exemplary system, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the present invention.

While the invention has been shown and described with respect to the preferred embodiments, it will be understood by those skilled in the art that various changes and modifications may be made without departing from the spirit and scope of the invention as defined in the following claims.

What is claimed is:

1. A terminal device generating metadata of an image, comprising:
    at least one of a camera module photographing or capturing the image,
    a gyro module sensing horizontality,
    a global positioning sensor (GPS) module calculating a position by receiving a satellite signal, and
    an audio module recording audio;
    a network module receiving sensor effect information from a sensor aggregator through a wireless communication network; and
    an application generating the metadata by performing timer-synchronization on the image photographed by the camera module, a sensor effect collected by using the gyro module or the GPS module, or the audio collected by using the audio module,
    wherein the application performs the timer synchronization by transmitting a timer synchronization message to the sensor aggregator through the network module.

2. The terminal device of claim 1, wherein the application records the metadata in a file and closes the media file in which the metadata is being recorded when receiving an end event.

3. The terminal device of claim 2, wherein if the media file is a file recorded based on Moving Picture Experts Group4 (MPEG4), when the media file is closed, the metadata is used as a track of the media file.

4. The terminal device of claim 1, wherein when the application receives an AV event meaning recording of audio video (AV) data, the photographed image and the collected audio are combined to be recorded in an AV media file.

5. The terminal device of claim 4, wherein the AV media file is recorded as a name of a date-time-sequence number format, if there is no previous AV media file which was prepared previously, the AV media file is newly generated, or if a previous AV media file is opened in advance, a content is added to the previous AV media.

6. The terminal device of claim 1, wherein the application allows the metadata to further include the sensor effect information received through the network module when receiving a sensor event meaning receiving of sensor data.

7. The terminal device of claim 1, wherein the application allows the metadata to further include the sensor effect collected by the gyro module or the GPS module when receiving a local sensor event meaning collecting of the sensor effect in the terminal device.

8. The terminal device of claim 1, wherein the application performs connection setting with the sensor aggregator based on an Internet protocol (IP) address of the sensor aggregator.

9. A method for generating metadata of an image in a terminal device, comprising the steps of:
    receiving sensor effect information from a sensor aggregator through a wireless communication network; and
    generating the metadata by timer-synchronizing an image photographed based on a camera module, a sensor effect collected by using a gyro module or a GPS module, or audio recorded based on an audio module,
    wherein when an end event is received, the metadata is recorded as a media file and the recording media file is closed,
    when an AV event meaning recording of audio video (AV) data is received, the photographed image and the recorded audio are combined to be recorded in the media file,
    when a sensor event meaning receiving of sensor data is received, the metadata further includes the sensor effect information received through the network module, and
    when a local sensor event meaning collecting of a sensor effect is received by the terminal device, the metadata further includes the sensor effect collected by the gyro module or the GPS module.

10. A sensor aggregator transmitting information for generating metadata of an image, comprising:
    at least one of a $CO_2$ sensor, a light sensor generating an illumination effect through the brightness of light, a humidity sensor generating a waterjet effect by detecting humidity, a temperature sensor generating a thermal effect by measuring a temperature, and a wind sensor generating a wind effect by measuring a wind strength;
    a sensor aggregating unit aggregating or analyzing sensor effect information collected through at least one of the $CO_2$ sensor, the light sensor, the humidity sensor, the temperature sensor, and the wind sensor; and
    a network module transmitting the sensor effect information to a terminal device through a wireless communication network,
    wherein the sensor aggregating unit closes the $CO_2$ sensor, the light sensor, the humidity sensor, the temperature sensor, and the wind sensor, closes the network module, and ends an application program when receiving an end event.

11. The sensor aggregator of claim 10, wherein the sensor aggregating unit performs connection setting with the terminal device, registers an Internet protocol (IP) address of the terminal device in a connection setting list, and performs timer synchronization with the terminal device, when receiving a connection request event of the terminal device.

12. The sensor aggregator of claimer 11, wherein the sensor aggregating unit releases the connection setting with the terminal device and deletes the IP address of the terminal device written in the connection setting list, when receiving a connection release event of the terminal device.

13. The sensor aggregator of claimer 11, wherein the sensor aggregating unit collects the sensor effect information from the $CO_2$ sensor, the light sensor, the humidity sensor, the temperature sensor, or the wind sensor, retrieves an IP address from the connection setting list, and transmits the sensor effect information to the terminal device corresponding to the retrieved IP address, when receiving a sensor event meaning transmitting of the sensor effect information.

14. A method for transmitting information related to metadata in a sensor aggregator, the method comprising:
    collecting a sensor effect from a $CO_2$ sensor detecting $CO_2$ gas, a light sensor generating an illumination effect by adjusting the brightness of light, a humidity sensor generating a waterjet effect by detecting humidity, a temperature sensor generating a thermal effect by measuring a temperature, or a wind sensor generating an wind effect by measuring a wind strength;

generating sensor effect information by aggregating or analyzing the collected sensor effect; and transmitting the sensor effect information to a terminal device through a wireless communication network, wherein the method further comprises, when an end event is input, closing the $CO_2$ sensor, the light sensor, the humidity sensor, the temperature sensor, and the wind sensor, closing the network module, and ending an application program.

15. The method of claim 14, further comprising, when a connection request event of the terminal device is input, performing connection setting with the terminal device, registering an Internet protocol (IP) address of the terminal device in a connection setting list, and performing timer synchronization with the terminal device.

16. The method of claim 15, further comprising, when a connection release event of the terminal device is input, releasing the connection setting with the terminal device and deleting the IP address of the terminal device written in the connection setting list.

17. The method of claim 15, further comprising, when a sensor event meaning transmitting of the sensor effect information is input, collecting the sensor effect information from the $CO_2$ sensor, the light sensor, the humidity sensor, the temperature sensor, or the wind sensor, retrieving an IP address from the connection setting list, and transmitting the sensor effect information to a terminal device corresponding to the retrieved IP address.

* * * * *